US009543598B2

(12) United States Patent
Otsuka et al.

(10) Patent No.: US 9,543,598 B2
(45) Date of Patent: Jan. 10, 2017

(54) FUEL CELL-POWERED MOTORCYCLE (71) Applicant: SUZUKI MOTOR CORPORATION, Shizuoka-Ken (JP)

(72) Inventors: Ryuji Otsuka, Shizuoka-Ken (JP); Yoshifumi Takai, Shizuoka-Ken (JP)

(73) Assignee: SUZUKI MOTOR CORPORATION (JP)

( * ) Notice: Subject to any disclaimer, the term of this patent is extended or adjusted under 35 U.S.C. 154(b) by 0 days.

(21) Appl. No.: 14/819,468

(22) Filed: Aug. 6, 2015

(65) Prior Publication Data
US 2016/0056482 A1    Feb. 25, 2016

(30) Foreign Application Priority Data

Aug. 20, 2014  (JP) ................. 2014-167435

(51) Int. Cl.
B62D 61/02       (2006.01)
H01M 8/04        (2016.01)
(Continued)

(52) U.S. Cl.
CPC ...... H01M 8/04014 (2013.01); B60L 11/1898 (2013.01); B62J 35/00 (2013.01); B62K 11/00 (2013.01); B62K 11/10 (2013.01); H01M 8/0438 (2013.01); H01M 8/0444 (2013.01); H01M 8/04089 (2013.01); H01M 8/04201 (2013.01); H01M 8/04679 (2013.01); H01M 8/04686 (2013.01); B62K 2202/00 (2013.01); B62K 2204/00 (2013.01); B62K 2208/00 (2013.01);
(Continued)

(58) Field of Classification Search
CPC ................ H01M 8/04014; H01M 8/04089; H01M 8/14201; H01M 8/0438; H01M 8/0444; H01M 8/04679; H01M 8/04686; B60L 11/1898; B62J 35/00; B62K 11/00; B62K 11/10
See application file for complete search history.

(56) References Cited

U.S. PATENT DOCUMENTS 8,479,857 B2 *   7/2013  Tamura .................... B60K 1/04
                                                     180/291
2008/0236914 A1 * 10/2008 Horii .................. B60L 11/1881
                                                     180/65.31
(Continued)

FOREIGN PATENT DOCUMENTS

JP    2004158221 A    6/2004
JP    2005116358 A    4/2005
(Continued)

Primary Examiner — Kevin Hurley
Assistant Examiner — Marlon A Arce
(74) Attorney, Agent, or Firm — Barnes & Thornburg LLP (57) ABSTRACT An air-cooled fuel cell-powered motorcycle allowing early detection of a malfunction in a fuel cell stack. The fuel cell-powered motorcycle includes a vehicle body; an electric motor for driving a driving wheel, an air-cooled fuel cell for supplying electric power to the electric motor and a hydrogen tank for storing a fuel gas supplied to the fuel cell, respectively housed in the vehicle body; a fan for supplying air as a reactant and a coolant to the fuel cell; and an exhaust duct for discharging the air having cooled the fuel cell out of a rear end of the vehicle body, the exhaust duct having an inlet connected to a rear end portion of the fuel cell.

5 Claims, 5 Drawing Sheets (51) Int. Cl.
*B60L 11/18* (2006.01)
*B62J 35/00* (2006.01)
*B62K 11/00* (2006.01)
*B62K 11/10* (2006.01)

(52) U.S. Cl.
CPC .......... *H01M 2250/20* (2013.01); *Y02E 60/50* (2013.01); *Y02T 90/32* (2013.01)

(56) References Cited

U.S. PATENT DOCUMENTS

2009/0095051 A1\* 4/2009 Suzuki ................ G01N 1/2226
73/23.2
2013/0302713 A1\* 11/2013 Yamamoto ........ H01M 8/04201
429/442

FOREIGN PATENT DOCUMENTS

| JP | 2008247324 A | 10/2008 |
|----|--------------|---------|
| JP | 2010247574 A | 11/2010 |
| JP | 2015077916 A | 4/2015  |

\* cited by examiner

FUEL CELL-POWERED MOTORCYCLE

TECHNICAL FIELD

The present invention relates to a fuel cell-powered motorcycle carrying an air-cooled fuel cell, and particularly to a fuel cell-powered motorcycle, equipped with a hydrogen sensor allowing early detection of a system malfunction which possibly occurs within a fuel-cell stack.

BACKGROUND ART

A fuel cell-powered motorcycle is designed to run by rotating a drive wheel driven by a motor which in turn is driven with an electric power generated by a fuel cell installed therein. Conventional fuel cell-powered motorcycles include those equipped with a water-cooled fuel cell which can generate a relatively large electric power, and those equipped with an air-cooled fuel cell which can generate a relatively small electric power of, e.g., several kilowatts.

The air-cooled fuel cell, while it generates a relatively small power, has advantages such that it un-necessitates accessories, such as a radiator, a cooling water pump and a reservoir tank, required for the water-cooled fuel cell and it can utilize air as a reactant gas for also cooling the heat generated with the power generation. The air-cooled fuel cell has a low pressure loss through the air channel, and its cooling system has a simple structure requiring a fan as a sufficient accessory device instead of a compressor and can suppress the power consumption of the fan.

The fuel cell-powered motorcycle carrying such an air-cooled fuel cell introduces air as a reactant and also a coolant by means of a fan and supplies it to the fuel cell. More specifically, the air introduced into the fuel cell functions as an oxidant for electrochemically reacting with hydrogen as a fuel by the fuel cell, and also as a coolant for cooling the fuel cell. Thus, at the fuel cell, the heat generated with power generation is cooled with the air which is a reactant gas.

In fuel cell-powered vehicles including such a fuel cell-powered motorcycle, it has been tried to dispose a hydrogen sensor in the vehicle body for the purpose of mainly for detection of hydrogen leaked from a fuel tank and a fuel-cell stack and improve the system. For example, Patent document 1 has proposed to install a hydrogen sensor in an upper corner of a tank housing which stores a fuel tank and provide a ventilation pipe exit from a fuel cell, thereby aiming at detecting hydrogen leaked out of the fuel tank and the fuel-cell stack with a single hydrogen sensor. Patent document 2 has proposed installing a fuel cell in a fuel-cell storage case, and installing a hydrogen sensor in an air pipe connecting a compressor (blower) with the storage case. However, the application of these systems to an air-cooled fuel cell-powered motorcycle involves severe problems accompanying the accommodation of the fuel cell (or the exhaust section thereof) within a housing case for the fuel tank or the fuel cell, that is, 1) the fuel cell system becomes complicated, thus spoiling the strong point of the air-cooled fuel cell, i.e., a simplified fuel cell system because of omission of a cooling water passage, and 2) it makes difficult the realization of the fundamentally advantageous performance of the air-cooled fuel cell-powered motorcycle of improved exhaust efficiency attained by reduction of air passage resistance while omitting a compressor.

On the other hand, Patent document 3 has proposed an air-cooled fuel cell-powered motorcycle wherein a fuel cell and a hydrogen tank are arranged in this order along a passage of air introduced from the front of vehicle body, and hydrogen sensors are disposed before and after the hydrogen tank, thereby improving the detection of hydrogen leaked into the body. According to our study, however, the above-mentioned layout has made it impossible to attain the improvement in efficiency of exhaust from the fuel cell due to the presence of the hydrogen tank arranged after the fuel cell and also fails in early detection of a malfunction occurring in the fuel cell stack.

PRIOR ART DOCUMENTS

Patent Documents

[Patent document 1] JP2005-116358A
[Patent document 2] JP2004-158221A
[Patent document 3] JP2008-247324A
[Patent document 4] JP2010-247574A

SUMMARY OF THE INVENTION

A principal object of the present invention is to quickly detect the operational status in the fuel-cell stack in an air-cooled fuel cell-powered motorcycle, and to accomplish early detection of a system malfunction at an early stage.

A further object of the present invention is to accomplish the above object in combination with an object of improving the exhaust efficiency through reduction of the ventilation resistance of an exhaust air system which is another subject of an air-cooled fuel cell-powered motorcycle.

The present applicant has earnestly studied for improving the exhaust efficiency through reduction of the ventilation resistance of the exhaust system in an air-cooled fuel cell-powered motorcycle and, as a result thereof, have found it desirable to dispose an exhaust duct connected to a portion of a fuel cell on a rear side of the vehicle body in an air supply system to a fuel cell using an air suction fan, for accomplishing the object, and has made a series of proposals (Patent document 4 and JP2015-77916A). In the course of study arriving at the present invention, it has been further found effective for achieving the above object to dispose a mechanism for detecting hydrogen in exhaust gas within the duct.

The fuel cell-powered motorcycle according to the present invention is based on the above-mentioned findings and comprises: a vehicle body, an electric motor for driving a driving wheel, an air-cooled fuel cell for supplying electric power to the electric motor and a hydrogen tank for storing a fuel gas supplied to the fuel cell, respectively housed in the vehicle body, a fan for supplying as a reactant and also as a coolant to the fuel cell, and an exhaust duct for discharging the air having cooled the fuel cell out of a rear end of the vehicle body, the exhaust duct having an inlet connected to a rear end portion of the fuel cell; wherein the motorcycle further includes an in-body hydrogen sensor for detecting hydrogen leaked out of the hydrogen tank, the fuel cell, and a pipe connecting between, and valves attached to, the hydrogen tank and the fuel cell, in a region in the vehicle body and outside the exhaust duct, and an in-duct hydrogen sensor for detecting hydrogen in the exhaust duct.

According to the present invention, by providing a hydrogen sensor in an exhaust duct in addition to an in-body hydrogen sensor for detecting hydrogen which leaks out of the hydrogen tank, the fuel cell, and a pipe connecting between, and valves attached to, the hydrogen tank and the fuel cell, in a region in the vehicle body and outside the exhaust duct, it becomes possible to detect a system malfunction occurring in a fuel-cell (FC) stack at an early stage. More specifically, it becomes possible to effect early detection of unusual leakage of hydrogen out of the FC stack, due to abnormal passage through a (polymer) electrolyte membrane by degradation and damage thereof, leakage from a hydrogen sealing gasket, failure of a purge valve, etc., in the FC stack, in distinction from excessive hydrogen purged during normal operation of the fuel cell (which appears as a regular or periodical change in in hydrogen concentration in the exhaust duct). In other words, by forming a sensor performing direct measurement of a hydrogen concentration in the exhaust duct which closely and early reflects the operating state of the FC stack system, it becomes possible to detect a system malfunction of the FC stack at an early stage and prevent beforehand a system malfunction which is liable to result in a serious accident.

EMBODIMENTS OF THE INVENTION

Hereinafter, some embodiments of the fuel cell-powered motorcycle according to the present invention are described with reference to accompanying drawings.

Figure 1:
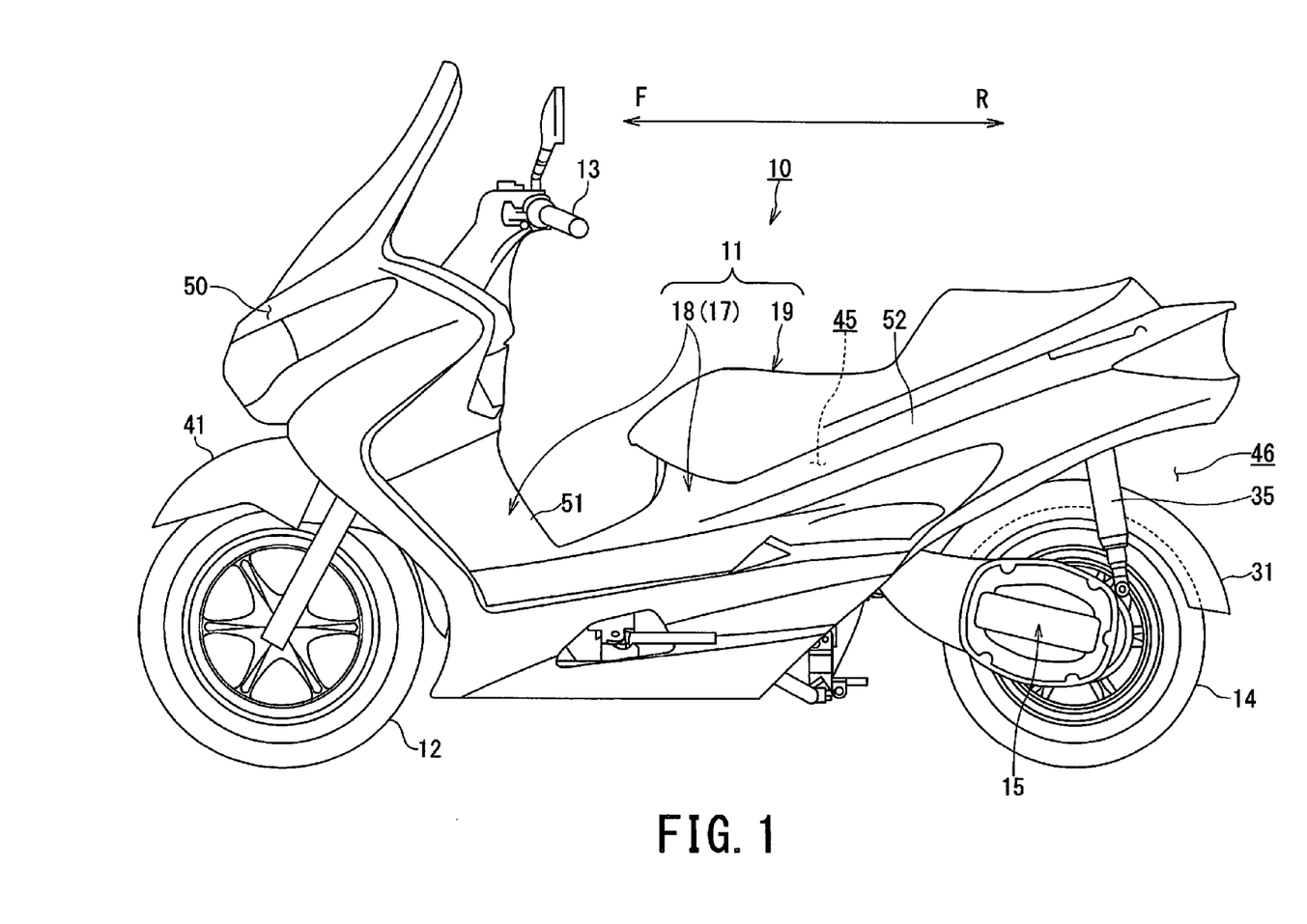
FIG. 1 is a left side perspective view of an entire body of a fuel cell-powered motorcycle as an embodiment of the invention.
Figure 2:
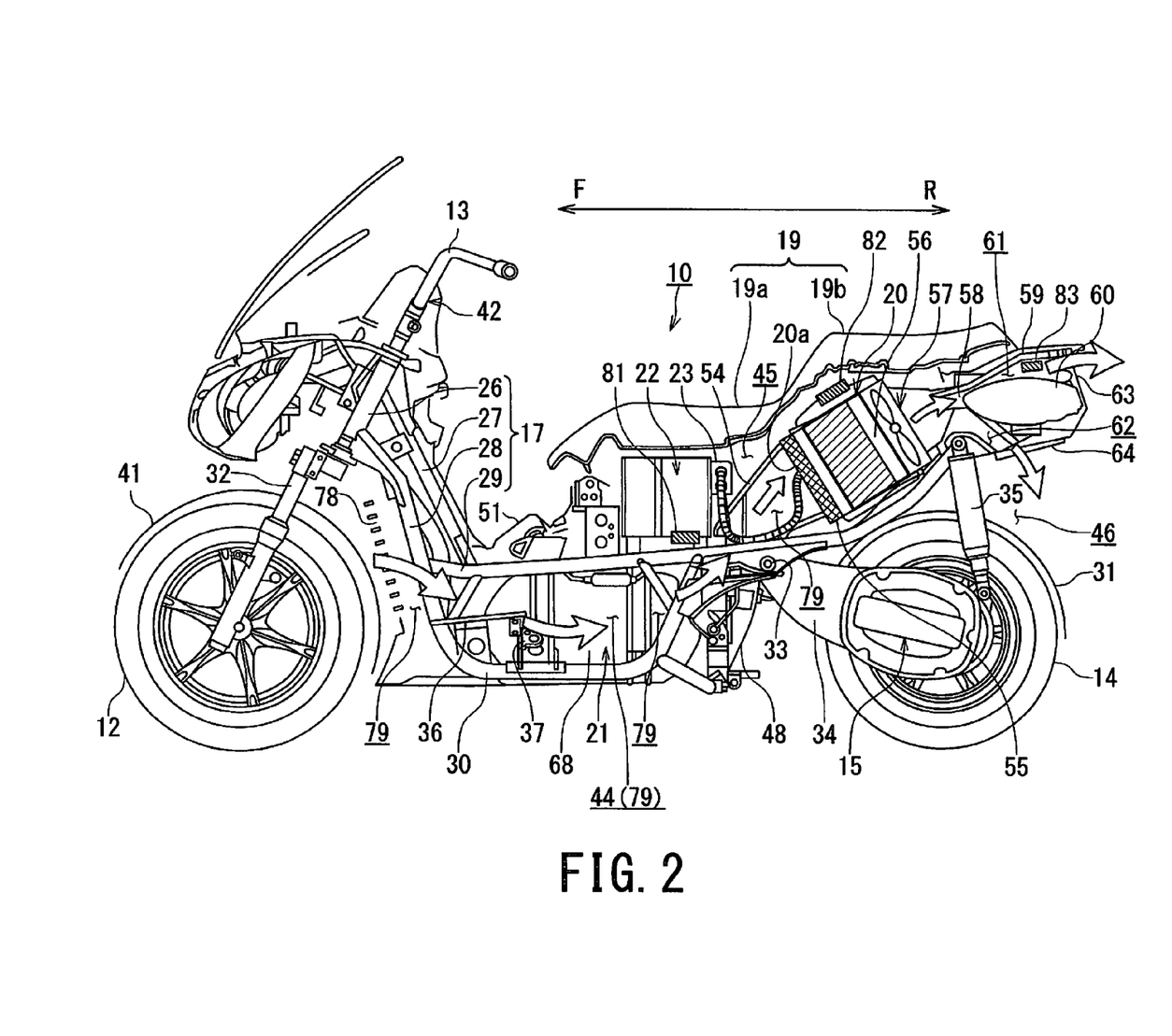
FIG. 2 is a left side view of the fuel cell-powered motorcycle of which the exterior is partially cut out to show the internal structure.

FIGS. 1 and 2 are figures showing a fuel cell-powered motorcycle as an embodiment of the fuel cell-powered motorcycle according to the present invention on the whole. FIG. 1 is a left side perspective view showing an outer appearance of a fuel cell-powered motorcycle 10, and FIG. 2 is a left side view of the fuel cell-powered motorcycle 10 of which the exterior is partially cut out to show the internal structure.

For brevity of description, the front side and the rear side of the fuel cell-powered motorcycle 10 are denoted by signs "F" and "R", respectively.

As shown in FIG. 1 and FIG. 2, the fuel cell-powered motorcycle 10 according to this embodiment is a motorcycle which runs using an electric power obtained from a fuel cell.

[Structure of Vehicle Body]

The fuel cell-powered motorcycle 10 is a scooter-type motorcycle. The fuel cell-powered motorcycle 10 includes a vehicle body 11, a front wheel 12 which is a steered wheel, a handle 13 for steering the front wheel 12, a rear wheel 14 which is a driving wheel, and a motor 15 that drives the rear wheel 14. The motor 15 functions as an electric motor which drives the driving wheel 14.

The vehicle body 11 includes a body frame 17 (FIG. 2) which is a main structure member (mainframe), a vehicle exterior 18 which covers the body frame 17, and a seat (driver seat) 19 disposed above the car body frame 17. The vehicle body 11 further includes an air-cooled fuel cell 20, a fuel tank 21 for storing a fuel used for power generation by the fuel cell 20, a secondary battery 22 for supplementing the power of the fuel cell 20, a power management device 23 which adjusts the output voltage of the fuel cell 20 and performs electric power distribution control of the fuel cell 20 and the secondary battery 22, and a motor controller (not shown) which transforms a direct-current electric power supplied from the power management device 23 into a three-phase alternating current electric power and performs operation control the of motor 15. Thus, the power train of the fuel cell-powered motor cycle 10 constitutes a hybrid system including the fuel cell 20 and the secondary battery 22.

The body frame 17 is provided with a head pipe 26, an upper down frame 27, a pair of right and left lower down frames 28, a pair of right and left upper frames 29, and a pair of right and left lower frames 30, to thereby constitute a mainframe.

The head pipe 26 pivotally supports a front fork 32 of a fork-type to the front part of the vehicle body 11.

The upper down frame 27 is connected to an upper part of the head pipe 26 and disposed to incline and fall back toward the back of the vehicle body 11.

The lower down frame 28 extends from the lower part of head tube 26 toward an almost right below or back lower direction.

The upper frame 29 extends in a front half of the vehicle body 11 from the lower end of the lower down frame 28 via the lower part of the upper down frame 27 toward the rear direction of the vehicle body 11, and smoothly inclines upwards toward the rear in a rear half of the vehicle body 11. A seat 19 is disposed above the latter half part of the upper frame 29.

The upper frame 29 is equipped with a pivot 33 in the latter half of the vehicle body 11. A swing arm 34 is swingably supported around the pivot 33. While a rear wheel 14 is supported pivotally at the rear end of the swing arm 34, the swing arm 34 is supported flexibly and vertically movably by a rear cushion unit 35. The rear cushion unit 35 is supported between the lower end of the swing arm 34 and the rear of the body frame 17. A rear fender 31 which covers the upper part and the back of the rear wheel 14 is attached below a spring together with the rear wheel 14, so as to be movable up and down.

The lower frames 30 extend from the lower end of the lower down frame 28 toward the lower part of the vehicle body 11, and are bent at a position near the lower end of the vehicle body 11. The lower frames 30 further extend in the extension direction of the vehicle body 11, and then are bent toward an upper and rear direction at an almost middle position of the vehicle body 11 to be connected to the upper frame 29. The lower frames 30 disposed in a right-and-left pair are equipped with footrests 36 for a rider at the front side thereof.

The front wheel 12 is supported rotatably pivoted to the front fork 32. The front fork 32 is formed in an elastic telescopic structure so as to allow elastic shape change, and a front fender 41 is supported above the front wheel 12. A steering handlebar 13 is connected to the upper end part of the front fork 32. The steering handlebar 13 is supported pivotally about the head pipe so as to allow free rotation, and constitutes a steering mechanism 42 of the fuel cell-powered motorcycle 10.

The motor 15 is an electric motor of fuel cell-powered motorcycle 10 for driving the rear wheel 14. The motor 15 is integrally attached to a swing arm 34, thereby constituting a part of a unit swing-type swing arm 34. The motor 15 is connected to a rear wheel axle via a deceleration mechanism to drive the rear wheel 14. Thus, a driving force generated by the motor 15 is transmitted to the rear wheel 14 via the deceleration mechanism.

With the thus-formed body frame 17, the vehicle body is equipped with a fuel tank 21 horizontally disposed in a center tunnel region 44 surrounded by a pair of right and left upper frames 29 and a pair of right and left lower frames 30, and is also equipped with a secondary battery 22, a power management device 23, a fuel cell 20, disposed in this order in a direction of the front to the rear of the vehicle body 11 and also a motor controller (not shown) in a device loading region (space) 45 surrounded with a rear half of the upper frame 29, the vehicles exterior 18 and the seat 19. The motor controller is disposed on a side of the power management device 23, e.g., a left-hand side or a right-hand side of the vehicle body 11. A rear space region 46 on a rear side of the center tunnel region 44 and on a lower rear side of the device loading region 45 in the body frame 17, is formed between a rear body cover 52 and a rear fender 31 and disposed above the rear wheel 14. A partition member 48 is disposed between the device loading region 45 and the rear space region 46, for defining the respective regions. The rear fender 31 preventing mud splashes from the rear wheel 14 is disposed to cover the rear and the surface of the rear wheel 14 and is disposed on a lower side of the rear cushion unit 35 so as to be movable up and down together with the rear wheel 14.

The vehicle exterior 18 includes a front leg shield cover 50 as a front body cover for covering a front half of the vehicle body 11, a front frame cover 51 as a central body cover located above the center of the vehicle body 11 for covering the upper frame 29 from thereabove, and a rear frame cover 52 as a rear body cover for covering sides of the vehicle body 11 below the seat 19. The rear frame cover 52, together with the seat 19, constitutes the device loading region 45 in which the fuel cell 20, the secondary battery 22, the power management device 23 and the motor controller are accommodated.

Therefore, the device loading region 45 is an a closed space surrounded by the seat 19, the rear frame cover 52 and the partition member 48 and, by providing a vent hole (not shown) at an appropriate position in the rear frame cover 52 as a rear body cover or the partition member 48, can easily and surely control the stream of the air as a reactant gas supplied to the fuel cell 20, and also the stream of the air as a cooling gas toward electric parts which require cooling. The device loading region 45 need not be a completely closed space.

The seat 19 is located at an upper position in a rear half of the vehicle body 11. The seat 19 is a tandem-type one and includes a front seat 19a on which a driver sits down and a rear seat 19b on which a fellow passenger sits down, integrally formed.

[Disposition and Structure of a Fuel Cell]

A fuel cell 20 used in the fuel cell-powered motorcycle 10 is disposed in a rear half of the vehicle body 11 and, more specifically, disposed in an forwardly falling style at a position shifted toward a rear side in the device loading region 45 defined under the seat 19. The fuel cell 20 is formed in a flat rectangular parallelepiped shape, and is inclined with its air intake face 20a having a feed port for reactant gas directed in a front lower direction. The air intake face 20a of the fuel cell 20 is located below a stepped part between the front seat 19a and the rear seat 19b of the seat 19, and is inclined downward in a direction toward the vehicle front.

The front of the fuel cell 20 is equipped with an air intake duct 54 inclined downward (toward a front lower direction), and air as reactant gas for a fuel-cell reaction and also as a coolant passes along the air intake duct 54 and is introduced into the fuel cell 20. The fuel cell 20 is also formed with an exhaust air face on a rear side opposite to the air intake face 20a.

Figure 3:
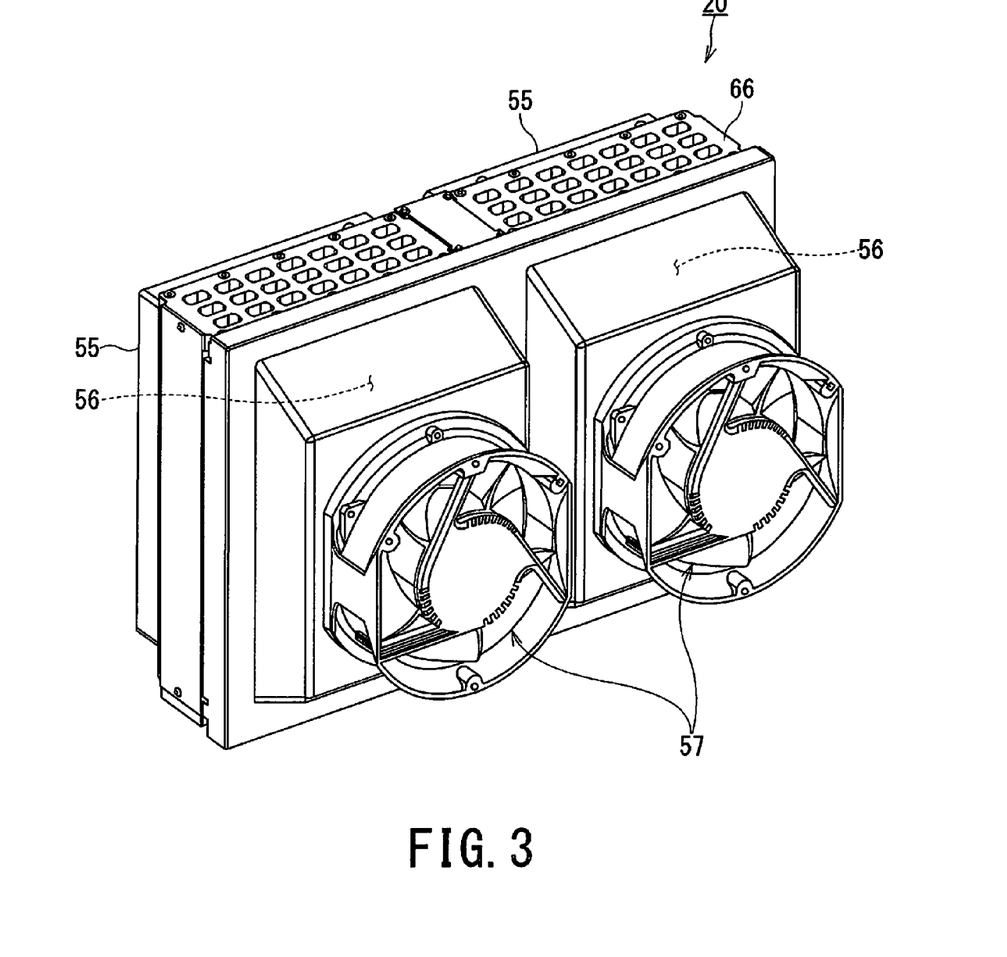
FIG. 3 is a perspective view a fuel cell to be loaded on the fuel cell-powered motorcycle as viewed from a left-hand side back thereof.

A dust-removing filter 55 (FIGS. 2 and 3) is disposed in front of the air intake face 20a, and a fan 57 is disposed after the exhaust air face of the fuel cell 20 via an exhaust air plenum (collector section) 56 to equalize exhaust gas pressure, as shown in FIG. 3. Air as reactant gas is sucked into the fuel cell 20 through the air intake face 20a. Oxygen contained in the air causes an electrochemical reaction with hydrogen gas as the fuel supplied from the fuel tank 21 to generate electricity, and humid excessive gas after power generation is discharged via the exhaust air plenum 56 and the fan 57 out of an exhaust port 58. In this process, the fuel cell 20 is cooled by the air as the reactant gas, and the exhaust port 58 of the fuel cell 20 is open for free passage to an exhaust duct 59. The air intake duct 54 is designed for pressure loss reduction through the passage to have a cross section almost equal to the area of the air intake face 20a of the fuel cell 20.

Figure 4:
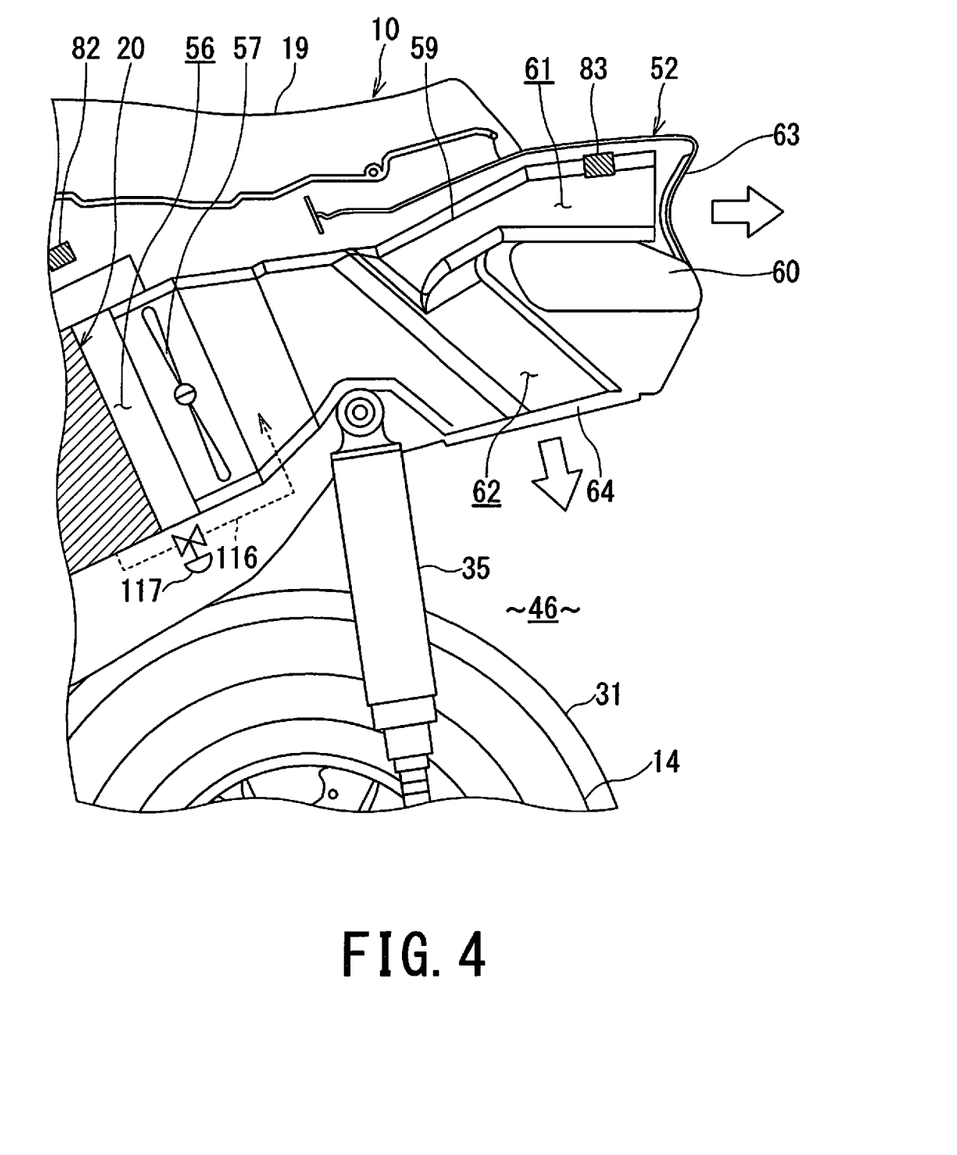
FIG. 4 is a partially cutout left side view of a rear part of the fuel cell-powered motorcycle showing an embodiment of arrangement of a hydrogen sensor.

The exhaust duct 59 is provided behind the fuel cell 20, as shown in FIG. 4. More specifically, the exhaust duct 59 may be provided to the exhaust air face side of the fuel cell 20 via the exhaust air plenum 56 and the fan 57 and branches into an upper exhaust passage 61 and a lower exhaust passage 62 so as to bypass a rear combination lamp 60 on the vehicle back while opening toward the rear direction and the rear lower direction of the vehicle back through an upper exhaust port 63 and a lower exhaust port 64, respectively.

The exhaust duct 59 has the upper exhaust port 63 disposed at a higher position than the opening position of the exhaust port 58 of the fuel cell 20, and the lower exhaust port 64 opening to a rear space region 46 of a negative pressure space opened widely, so that the humid excess gas containing unreacted hydrogen can be surely and smoothly discharged out of the vehicle body 11.

Since the lower exhaust port 64 of the lower exhaust passage 62 formed in the exhaust duct 59 is attached to the swing arm 34 which rotatably supports the rear wheel 14 below the spring 35 so that rear fender 31 may rock integrally with rear wheel 14, the lower exhaust port is allowed to have a large opening size with less restrictions regarding the size.

On the other hand, the fuel cell 20 is provided with a fuel-cell stack 66 formed by stacking a plurality of unit cells, and also a filter 55 for removing dust on its front face, a suction fan 57 for forcibly supplying air as a reactant and a coolant on its back and an exhaust air plenum 56 for uniformizing the air pressure between the fuel-cell stack 66 and the fan 57. Further, the exhaust duct 59 is also designed to have a large cross section while branching into an upper exhaust passage 61 and a lower exhaust passage to realize a smaller pressure loss through the passages, similarly as the air-intake duct 54.

[Fuel Tank]

The fuel tank 21 is a cylindrical pressure vessel formed of, e.g., carbon fiber-reinforced plastics (CFRP), having hemispherical panels at both ends and constitutes an about 70 MPa-high-pressure compressed hydrogen storage system. The fuel tank 21 supplies fuel hydrogen gas to the fuel cell 20 via a cutoff valve (a fuel supply valve, not shown) provided with a pressure regulator. The fuel tank 21 is installed in the state of lying with its longitudinal axis aligning in the extension direction of the vehicle body 11 in the center tunnel region 44 forming an almost center lower part of the vehicle body 11. Accordingly, the fuel tank 21 is surrounded by the mainframe including a pair of upper frames 29 and a pair of lower frames 30, and is strongly protected from accidents, such as a tumbling or a collision of the fuel cell-powered motorcycle 10. The fuel tank 21 is also sandwiched between right and left footrests 36 provided in the lower frame 30.

The fuel tank 21 is provided in the center tunnel region 44 in the central body cover 51 while being supported, e.g., by clamp bands formed between an upper frame 29 arranged on a right-hand side of the vehicle body 11 and a lower frame 30 arranged on a left- or right-hand side of the vehicle body 11. On the other hand, intake-air introduction ports 78 for taking in ambient air are formed in the central body cover 51 of the vehicle exterior 18 which covers the vehicle body 11 of the fuel cell-powered motorcycle 10. As shown in FIG. 2, the intake-air introduction ports 78 are provided in the front face of a cowling which is behind the front wheel 12 and before the central body cover 51. Through the ports 78, ambient running air is forcibly introduced along with the vehicle running and led to the fuel cell 20 through an intake air passage (79).

The reactant and cooling air is sucked through the intake-air introduction ports 78 and guided via the center tunnel region 44 (intake air passage 79) surrounded by the central body cover 51 and the vehicle exterior 18 (shown in FIG. 1) of the undercover to the air intake duct 54, and then to the air intake face 20a of the fuel cell 20. In the center tunnel region 44, the intake air passage 79 is guided in the vehicle longitudinal (front to rear) direction along the periphery of the fuel tank 21 and deflected toward a rear upper direction by the partition member 48 up to the air intake duct 54.

In the fuel cell-powered motorcycle 10, vehicle components, such as the fuel cell 20, the fuel tank 21, the secondary battery 22, the power management device and a vehicle motor controller (not shown), are loaded in the space surrounded by the central body cover 51, the rear body cover 52, undercover, and the seat 19.

[Secondary Battery]

The secondary battery 22 is disposed ahead of the air intake duct 54 of the fuel cell 20 and may comprise, e.g. a box-shaped lithium ion battery. The secondary battery 22 is disposed above the back side-panel of a pressure vessel 68 of the fuel tank 21 while being shifted to the front side of the device loading region 45 defined under the seat 19. More specifically, the secondary battery 22 is disposed under the front seat 19a of the seat 19 on which a rider is seated, and disposed nearly vertical to a hypothetical horizontal plane of the fuel cell-powered motorcycle 10. The fuel cell-powered motorcycle 10 is a hybrid vehicle which has a fuel cell 20 and a secondary battery 22 as power supplies. The secondary battery 22 is connected to a motor controller (load) in parallel with the fuel cell 20 to supply its after transformation into an AC power as drive electricity to the motor 15 while absorbing a regeneration energy at the time of a slowdown. Incidentally, the fuel cell-powered motorcycle 10 can be equipped with another secondary battery 22 which can supply the electric power of 12V, in addition to the above-mentioned secondary battery 22, as a power supply for, e.g., meters (not shown) and lamps (not shown) 22. The secondary battery 22 may be disposed at a side of the pressure vessel 61 of the fuel tank 21, e.g., at a right-hand side of the vehicle body 11.

A power management device 23 and a motor controller (not shown) are disposed between the secondary battery and the fuel cell 20 and/or in the gap of the secondary battery 22 and the fuel cell 20.

[Power Generation Principle of Fuel Cell]

In the fuel cell-powered motorcycle 10 of this embodiment, the fuel cell 20 is used as an electric power source of the vehicle drive motor 15.

More specifically, it is well known that an ordinary polymer electrolyte fuel cell (PEFC), as an embodiment of the fuel cell 20, has a structure of stack 66 comprising a multiplicity of stacked unit cells each including an anode and a cathode which are supplied with hydrogen and air (oxygen) and a laminate of diffusion layer/catalyst layer/ solid polymer electrolyte membrane selectively transmitting hydrogen ions/catalyst layer/diffusion layer sandwiched between the anode and the cathode. As mentioned above, the fuel cell 20 functions as an electrochemical system which generates electric power by an electrochemical reaction of hydrogen and air (oxygen) which are supplied from the fuel tank 21 and the intake passage 79, respectively, to the fuel cell 20, while by-producing water.

Excessive air after the reaction with hydrogen and air after cooling the fuel-cell stack 66 are discharged as cathode exhaust air from (the stack 66 of) the fuel cell 20 through the exhaust air plenum 56 and the suction fans 57 to an exhaust duct 59, as shown in FIGS. 3 and 4.

On the other hand, hydrogen from the fuel tank 21 is supplied in an amount corresponding to the amount of consumption in the fuel cell in principle to the anode of the fuel cell 20 via a hydrogen supply pipe (not shown) which usually includes a circulating route. However, in order to prevent a decrease in the hydrogen concentration (and an accompanying lowering in the reaction efficiency) due to nitrogen which inevitably penetrates a fuel-cell stack from the air route side (cathode side) with continuation of a fuel-cell reaction and to effect stable power generation, and also in order to discharge the water generated by the reaction, it is necessary to periodically carry out exhaust (hydrogen gas purge) from the anode side via a hydrogen purge pipe 116 and a purge valve 117 to an exhaust duct 59 downstream of the suction fan 37. When performing the hydrogen gas purge from the anode side, the anode exhaust gas is diluted with cathode exhaust air to below inflammable lower limit concentration (hydrogen concentration of less than 4%) to be discharged to the atmosphere. More specifically, the hydrogen concentration is calculated based on a nitrogen concentration and a moisture concentration which in turn is calculated from the amount of generated electricity and power generation time, and the frequency and duration of the hydrogen gas purge is optimized also in consideration of the flow rate of the cathode exhaust as the dilution gas to provide a concentration below the inflammable lower limit.

As described above, in this embodiment, as shown in FIG. 2, environmental air taken in through air intake ports 78 formed at a frontal part of the central body cover 51 the fuel cell-powered motorcycle 10 is supplied through intake air passage 79 to the fuel cell 20, is mainly performed by the operation of the suction or air-intake fun 57. Since the air intake ports 78 are formed at a vehicle front, a positive pressure at the time of vehicle running acts on the air (environment air) taken in from the air intake ports 78 to forcibly push the air through the intake air passage into the fuel-cell 20. This enables a lowering of the load on the fan 57 of the fuel-cell 20. However, the load on the air intake fan 57 can also be further reduced, if needed, by inserting a filter and a blower at arbitrary position of the intake air passage 79 from the air-intake port 78 to the fuel cell 20.

The fuel tank 21 is cooled by the adiabatic expansion effect at the time of emitting and supplying hydrogen from the fuel tank 21 to the fuel cell 20. As a result, the air as the reactant and coolant passing around the fuel tank 21 is positively cooled, whereby the effect of chilling the fuel tank 21 is improved and the amount of required air can be saved. Consequently, the load on the fan 57 can be further reduced to accomplish an effect of saving the electric power thereto.

[Hydrogen Sensor]

In this embodiment (first embodiment), as shown in FIG. 2 and FIG. 4, a first in-body hydrogen sensor 81 is disposed above the hydrogen tank 21 at the body center, preferably above a fueling valve (not shown) for supplying fuel hydrogen through piping to the fuel cell 20, a second in-body hydrogen sensor 82 is disposed above the fuel cell 20, and further an in-duct hydrogen sensor 83 is disposed near the exit of the ceiling surface of an upper exhaust passage 61 which is one of two exhaust passages formed in division into upper and lower parts of an exhaust duct 59. The locations of the in-body hydrogen sensors in this embodiment are optimum for detection of leakage hydrogen from the most typical ones among possible hydrogen leakage parts in the body, i.e., the hydrogen tank and the fuel cell.

On the other hand, while it is generally preferred to dispose the in-duct hydrogen sensor at a position in the duct 59 where purge hydrogen and air from the suction fan 57 are well mixed, for understanding the operation state within the fuel cell stack, the above-mentioned location of the in-duct hydrogen sensor disposed at the highest position in the duct is optimum for detection of hydrogen which is lighter than air also from this viewpoint. In case where the rise of hydrogen concentration detected by the in-duct sensor 83 is slight, it is fed back to the control of (power increase to) the suction fan 57 also effective for hydrogen dilution so that the hydrogen concentration in the exhaust gas out of the vehicle does not exceed the legal regulatory value (less than 4%). When an abnormal value is not improved even by the above measure, the abnormality is judged to be caused by a failure of a fueling valve or a purge valve, or by serious damage to the polymer electrolyte film, and a system stop or warning will be taken. As hydrogen sensors 81-83, a catalytic combustion type hydrogen sensor, a hydrogen sensor for vehicles, for detection of a concentration in the range of 0 to 4%, etc., for example, may be suitably used.

Second Embodiment

Figure 5:
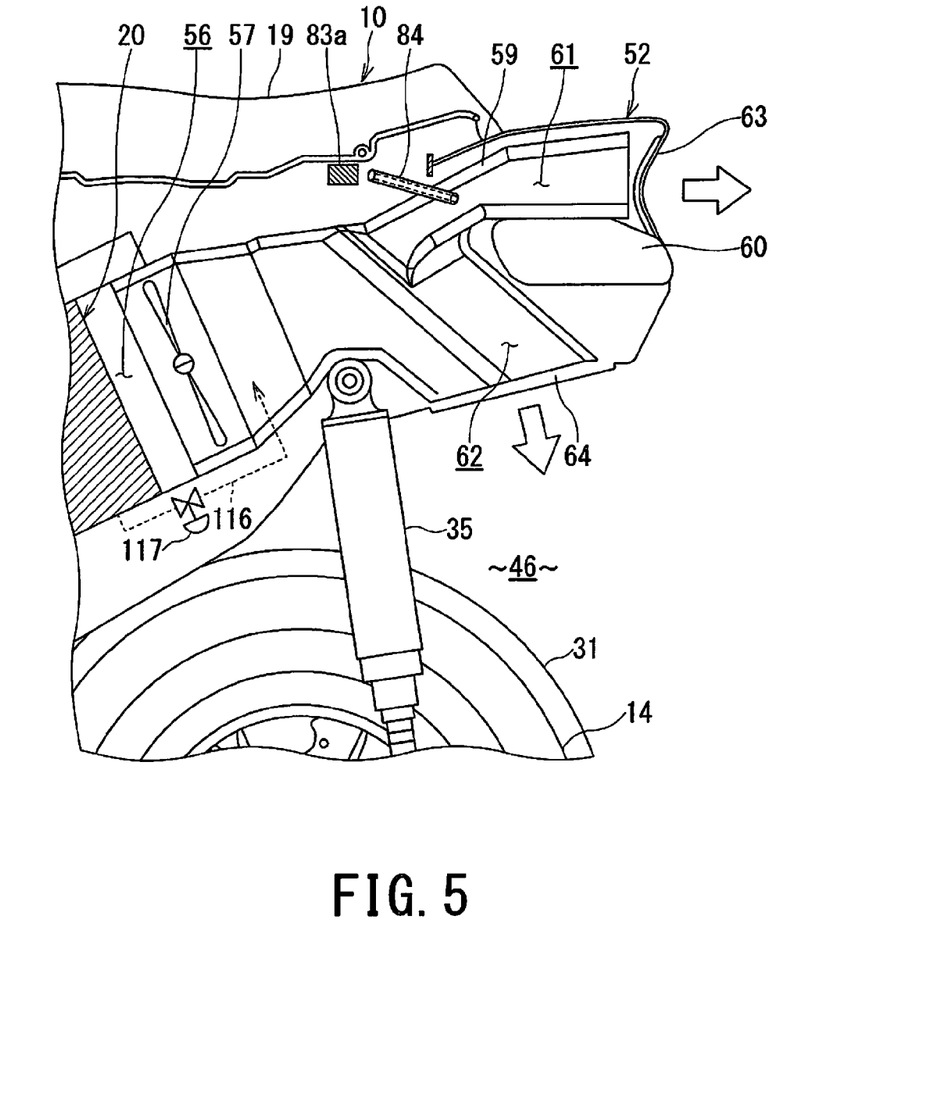
FIG. 5 is a partially cutout left side view of a rear part of the fuel cell-powered motorcycle showing another embodiment of arrangement of a hydrogen sensor.

In this embodiment (illustrated in FIG. 5), compared from the above-mentioned first embodiment (described with reference to FIG. 4), a hydrogen sensor 83a is disposed, instead of the second in-body hydrogen sensor 82, at a position which is above the fuel cell 20 and on a rear side of the vehicle body, and one opening end of an exhaust air hose (bypass pipe) 84 is inserted into the exhaust duct 59 defining the upper exhaust passage 61 while directing the other end opening toward the hydrogen sensor 83a which is disposed obliquely upward of the other end of the exhaust air hose 59, whereby the hydrogen sensor 83a is used as a second in-body hydrogen sensor and also as an in-duct hydrogen sensor by utilizing upward directivity of hydrogen. As a result, the hydrogen sensor 83a is provided with a function of an in-duct hydrogen sensor desirable for early detection of the operating state of the fuel-cell stack, while preventing the increase in number of hydrogen sensors.

In the above, the fuel cell-powered motorcycle of the present invention has been described with reference to embodiments applied to a two-wheel scooter type motorcycle, for example, but can also be applied to saddle-type fuel cell-powered motorcycles in general, inclusive of two-wheel vehicles, three-wheel vehicles and buggy cars.

What is claimed is:

1. A fuel cell-powered motorcycle, comprising:
a vehicle body;
an electric motor for driving a driving wheel, an air-cooled fuel cell for supplying electric power to the electric motor and a hydrogen tank for storing a fuel gas supplied to the fuel cell, respectively housed in the vehicle body, the fuel cell having an exhaust gas face and including an exhaust port after the exhaust gas face;
a suction fan for forcively supplying air as a reactant and a coolant to the fuel cell and discharging exhaust gas from the fuel cell, the suction fan being disposed between the exhaust gas face and the exhaust port, respectively, of the fuel cell; and
an exhaust duct for receiving the exhaust gas supplied via the suction fan and discharging the exhaust gas from the fuel cell out of a rear end of the vehicle body, the exhaust duct having an inlet communicatively connected to the exhaust port of the fuel cell;
wherein the motorcycle further includes an in-body hydrogen sensor for detecting hydrogen leaked out of the hydrogen tank, the fuel cell, and a pipe connecting between, and valves attached to, the hydrogen tank and the fuel cell in a region in the vehicle body and outside the exhaust duct, and an in-duct hydrogen sensor for detecting hydrogen in the exhaust duct;
said in-duct hydrogen sensor is disposed at a relatively high position in the exhaust duct where the exhaust gas from the fuel cell has been fully mixed to allow the detection of a hydrogen concentration therein; and
said in-duct hydrogen sensor is disposed on an inner ceiling surface of the exhaust duct at a position which is higher than an exit of the fuel cell and close to an exit of the exhaust duct.

2. The fuel cell-powered motorcycle of claim 1, wherein said exhaust duct includes an inlet connected to the rear end portion of the fuel cell and branches into an upper exhaust passage and a lower exhaust passage so as to by-pass a rear combination lamp disposed on a back of the vehicle, the upper exhaust passage having an opening exit above the rear combination lamp and the lower exhaust passage having an opening exit in a lower face of a rear body cover disposed below the rear combination lamp, and
wherein said in-duct hydrogen sensor is disposed on an inner ceiling surface defining the exhaust passage at a position which is close to the exit of the exhaust duct.

3. The fuel cell-powered motorcycle of claim 1 wherein said in-body hydrogen sensor includes a first in-body hydrogen sensor disposed above the hydrogen tank disposed at a center of the vehicle body, and a second in-body hydrogen sensor disposed above the fuel cell.

4. A fuel cell-powered motorcycle, comprising:
a vehicle body;
an electric motor for driving a driving wheel, an air-cooled fuel cell for supplying electric power to the electric motor and a hydrogen tank for storing a fuel gas supplied to the fuel cell, respectively housed in the vehicle body, the fuel cell having an exhaust gas face and includes an exhaust port after the exhaust gas face;

a suction fan for forcively supplying air as a reactant and a coolant to the fuel cell and discharging exhaust gas from the fuel cell, the suction fan being disposed between the exhaust gas face and the exhaust port, respectively, of the fuel cell; and an exhaust duct for receiving the exhaust gas supplied via the suction fan and discharging the exhaust gas from the fuel cell out of a rear end of the vehicle body, the exhaust duct having an inlet communicatively connected to the exhaust port of the fuel cell;

wherein the motorcycle further includes an in-body hydrogen sensor for detecting hydrogen leaked out of the hydrogen tank, the fuel cell, and a pipe connecting between, and valves attached to, the hydrogen tank and the fuel cell in a region in the vehicle body and outside the exhaust duct, and an in-duct hydrogen sensor for detecting hydrogen in the exhaust duct;

said in-duct hydrogen sensor is disposed at a relatively high position in the exhaust duct where the exhaust gas from the fuel cell has been fully mixed to allow the detection of a hydrogen concentration therein; and an exhaust hose is inserted into the exhaust duct so as to have one opening end communicative within the exhaust duct and another end opening toward the in-body hydrogen sensor so that the in-body hydrogen sensor has also the function of the in-duct hydrogen sensor.

5. The fuel cell-powered motorcycle of claim 4, wherein said in-body hydrogen sensor includes a first in-body hydrogen sensor disposed above the hydrogen tank disposed at a center of the vehicle body, and a second in-body hydrogen sensor disposed above the fuel cell and a position biased toward the rear of the vehicle body outside the exhaust duct, whereby the second in-body hydrogen sensor has also the function of the in-duct hydrogen sensor.

* * * * *